United States Patent
Rottler et al.

(10) Patent No.: US 9,661,068 B2
(45) Date of Patent: *May 23, 2017

(54) SYSTEMS, METHODS, AND COMPUTER READABLE MEDIA FOR SHARING ENVIRONMENT INFORMATION

(71) Applicant: Apple Inc., Cupertino, CA (US)

(72) Inventors: Benjamin A. Rottler, San Francisco, CA (US); Kyle Patrick Nadeau, Malden, MA (US); Tyler Mincey, San Francisco, CA (US); Taido Nakajima, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/821,544

(22) Filed: Aug. 7, 2015

(65) Prior Publication Data

US 2016/0105491 A1 Apr. 14, 2016

Related U.S. Application Data

(63) Continuation of application No. 12/893,814, filed on Sep. 29, 2010, now Pat. No. 9,107,040.

(51) Int. Cl.
*G06F 15/16* (2006.01)
*H04L 29/08* (2006.01)
(Continued)

(52) U.S. Cl.
CPC .......... *H04L 67/10* (2013.01); *G06F 21/6218* (2013.01); *H04M 1/72572* (2013.01);
(Continued)

(58) Field of Classification Search
CPC ............. H04W 4/023; H04M 1/72527; H04M 1/72572; G01S 5/0284; H04L 67/10; G06F 21/6218
See application file for complete search history.

(56) References Cited

U.S. PATENT DOCUMENTS 5,812,865 A 9/1998 Theimer et al.
6,160,551 A 12/2000 Naughton et al.
(Continued)

FOREIGN PATENT DOCUMENTS

EP 19980306586 A3 5/2003
EP 0744839 B1 3/2006
(Continued)

OTHER PUBLICATIONS

Part 11: Wireless LAN Medium Access Control (MAC) and Physical Layer (PHY) Specifications, IEEE Std 802.11, 1997, 459 pages.
(Continued)

*Primary Examiner* — John B Walsh
(74) *Attorney, Agent, or Firm* — Kilpatrick Townsend & Stockton

(57) ABSTRACT

Systems, methods, and computer readable media for sharing awareness information are provided. A non-aware electronic device can require awareness information including, for example, information about its environment or information about its status within its environment, in order to perform a particular device operation. When the non-aware device lacks an awareness component for detecting the required type of awareness information, the non-aware device can establish a communications path with an aware device that includes such an appropriate awareness component. The aware device can share the required type of awareness information as captured by its awareness component with the non-aware device. The distance between the non-aware device and the aware device can be less than a threshold distance to ensure that the shared awareness information is relevant to the non-aware device.

27 Claims, 10 Drawing Sheets

(51) Int. Cl.
*H04W 4/02* (2009.01)
*G06F 21/62* (2013.01)
*H04M 1/725* (2006.01)
*G01S 5/02* (2010.01)

(52) U.S. Cl.
CPC ........... *H04W 4/023* (2013.01); *G01S 5/0284* (2013.01); *H04M 1/72527* (2013.01)

(56) References Cited

U.S. PATENT DOCUMENTS

| | | |
|---|---|---|
| 6,185,491 B1 | 2/2001 | Gray et al. |
| 6,255,961 B1 | 7/2001 | Van Ryzin et al. |
| 6,259,892 B1 | 7/2001 | Helferich |
| 6,314,094 B1 | 11/2001 | Boys |
| 6,314,326 B1 | 11/2001 | Fuchu |
| 6,339,706 B1 | 1/2002 | Tillgren et al. |
| 6,353,637 B1 | 3/2002 | Mansour et al. |
| 6,401,085 B1 | 6/2002 | Gershman et al. |
| 6,407,750 B1 | 6/2002 | Gioscia et al. |
| 6,418,330 B1 | 7/2002 | Lee |
| 6,487,663 B1 | 11/2002 | Jaisimha et al. |
| 6,510,210 B1 | 1/2003 | Baughan |
| 6,516,466 B1 | 2/2003 | Jackson |
| 6,526,335 B1 | 2/2003 | Treyz et al. |
| 6,559,773 B1 | 5/2003 | Berry |
| 6,658,247 B1 | 12/2003 | Saito |
| 6,728,531 B1 | 4/2004 | Lee et al. |
| 6,793,607 B2 | 9/2004 | Neil |
| 6,823,225 B1 | 11/2004 | Sass |
| 6,845,398 B1 | 1/2005 | Galensky et al. |
| 6,901,067 B1 | 5/2005 | Kalavade |
| 7,030,735 B2 | 4/2006 | Chen |
| 7,065,342 B1 | 6/2006 | Rolf |
| 7,187,947 B1 | 3/2007 | White et al. |
| 7,321,783 B2 | 1/2008 | Kim |
| 7,440,772 B2 | 10/2008 | White et al. |
| 7,444,353 B1 | 10/2008 | Chen et al. |
| 7,486,926 B2 | 2/2009 | White et al. |
| 7,618,345 B2 | 11/2009 | Corbalis et al. |
| 7,634,228 B2 | 12/2009 | White et al. |
| 7,670,263 B2 | 3/2010 | Ellis et al. |
| 2002/0010759 A1 | 1/2002 | Hitson et al. |
| 2002/0046084 A1 | 4/2002 | Steele et al. |
| 2002/0164973 A1 | 11/2002 | Janik et al. |
| 2003/0069899 A1 | 4/2003 | Brown et al. |
| 2003/0208113 A1 | 11/2003 | Mault et al. |
| 2005/0074123 A1* | 4/2005 | Cromer ............... G06F 21/575 380/270 |
| 2005/0229200 A1 | 10/2005 | Kirkland et al. |
| 2007/0124427 A1 | 5/2007 | Light et al. |
| 2007/0226034 A1 | 9/2007 | Khan |
| 2007/0249288 A1 | 10/2007 | Moallemi et al. |
| 2007/0250910 A1* | 10/2007 | Miller ................ G06F 21/50 726/4 |
| 2007/0264969 A1 | 11/2007 | Frank et al. |
| 2007/0282678 A1 | 12/2007 | Dendi et al. |
| 2007/0297028 A1 | 12/2007 | Wulff et al. |
| 2009/0148827 A1 | 6/2009 | Argott |
| 2009/0157839 A1 | 6/2009 | Diederichs et al. |
| 2009/0170532 A1 | 7/2009 | Lee et al. |
| 2009/0210822 A1 | 8/2009 | Schindler |
| 2010/0027426 A1 | 2/2010 | Nair et al. |
| 2010/0228588 A1 | 9/2010 | Nielsen et al. |
| 2010/0274569 A1 | 10/2010 | Reudink |
| 2011/0047687 A1 | 3/2011 | Lee et al. |
| 2011/0319022 A1 | 12/2011 | Arad et al. |

FOREIGN PATENT DOCUMENTS

| | | |
|---|---|---|
| EP | 19980309003 B1 | 7/2015 |
| WO | 2004/005265 A1 | 1/2004 |

OTHER PUBLICATIONS

Lind, R., et al., "The Network Vehicle—A Glimpse into the Future of Mobile Multi-Media," Proceedings of the 17th DASC, Oct. 31-Nov. 7, 1998, 8 pages, published in the AIAA/IEEE/SAE, (vol. 2).
Nokia Quick Guide Accessories Guide, 1999, 36 pages.
Nokia 9110 User's Manual, 1999, 95 pages.
Samsung Model SCH-3500, Sprint PCS User Guide, 1999, 111 pages.
Orubeondo, "Trim AirCard 300 Eases Power Demands." InfoWorld vol. 21, Issue 48, pp. 46 & 50, Nov. 29, 1999.
"Sierra Wireless Announces First Cellular Network Interface Card for Notebook PCs; The AirCard 300 for Windows Changes the Way Notebook PC Users Make Wireless Connections." Business Wire, Jun. 21, 1999 (http://findarticles.com/p/particles/mi.sub--m0EIN/is.sub.--1999.sub--Ju- ne.sub.--21/ai.sub.--54937451/), retrieved Aug. 5, 2009.
"Cellular for Notebook PCs." CIO vol. 13, No. 1, Section 1, p. 90, Oct. 1, 1999.
"Briefs: Sierra Wireless . . . " NetworkWorld vol. 16, No. 34, p. 27, Aug. 23, 1999.
"Specification of the Bluetooth System, vol. 1." pp. 1-1080, Nov. 29, 1999.
Specification of the Bluetooth System, vol. 2. pp. 1-438, Nov. 29, 1999.
Digital Cellular Telecommunications System (Phase 2+); General Packet Radio Service (GPRS); Overall Description of the GPRS Radio Interface; Stage 2 (GSM 03.64 version 6.0.1 Release 1997) pp. 1-56, Aug. 1998.
Digital Cellular Telecommunications System (Phase 2+); General Packet Radio Service (GPRS); Overall Description of the GPRS Radio Interface; Stage 2 (GSM 03.64 version 6.3.0 Release 1997) pp. 1-42, Jul. 1999.
Digital Cellular Telecommunications System (Phase 2+); General Packet Radio Service (GPRS); Overall Description of the GPRS Radio Interface; Stage 2 (GSM 03.64 version 7.0.0 Release 1997) pp. 1-41, Jul. 1999.
Cai et al. "General Packet Radio Service in GSM" IEEE Communications Magazine, Oct. 1997, pp. 122-131.
StarTAC, Sprint PCS User Guide, pp. 1-118, Mar. 1999.
Digital Cellular Telecommunications System (Phase 2+); General Packet Radio Service (GPRS); Overall Description of the GPRS Radio Interface; Stage 2 (GSM 03.64 version 6.1.0 Release 1997) pp. 1-42, Oct. 1998.
Digital Cellular Telecommunications System (Phase 2+); General Packet Radio Service (GPRS); Overall Description of the GPRS Radio Interface; Stage 2 (GSM 03.64 version 6.2.0 Release 1997) pp. 1-42, May 1999.
Visteon: For Your Listening Pleasure—Any Music, Any Time, Anwhere (http://www2.prnewswire.com/cgi-bin/stories.pl?ACCT=104&STORY4=/www/story- /01-05-2000/0001107812&DATE), originally retrieved Jan. 5, 2000.
Qualcomm QCP—1960.™., Sprint PCS User Guide, pp. 1-76, Apr. 1999. cited by applicant.

* cited by examiner

SYSTEMS, METHODS, AND COMPUTER READABLE MEDIA FOR SHARING ENVIRONMENT INFORMATION

CROSS-REFERENCES TO RELATED APPLICATIONS

This application is a continuation of U.S. application Ser. No. 12/893,814, filed Sep. 29, 2010, which is hereby incorporated by reference in its entirety for all purposes.

FIELD OF THE INVENTION

This can relate to systems, methods, and computer readable media for sharing awareness information and, more particularly, to systems, methods, and computer readable media for using awareness information retrieved from an aware electronic device to perform an operation with a non-aware electronic device.

BACKGROUND

Some electronic devices can retrieve data relating to the surrounding environment. For example, such an electronic device can include one or more sensors or other suitable components for detecting "awareness" information corresponding to the device's surrounding environment. Such a device may be known as an "aware" electronic device. Using its detected awareness information, an aware device can perform one or more specific operations (e.g., change the brightness of a screen or provide a current location to a social network). Other devices, however, may not include any or all of the sensors or other suitable components required to detect certain awareness information. Such a device may be known as a "non-aware" electronic device. Due to the absence of these sensors or other suitable components, the usefulness of a non-aware device can be reduced and even impeded to the point that the device often loses its usefulness or appeal in particular situations.

SUMMARY

Systems, methods and computer-readable media for sharing awareness information are provided.

For example, in some embodiments, there is provided a method for sharing awareness information. The method may include receiving a request for awareness information at a first device and determining that the first device does not include an awareness component corresponding to the requested awareness information. Next, the method may include identifying a second device in physical proximity of the first device that does include an awareness component corresponding to the requested awareness information. Then, the method may include receiving at the first device the requested awareness information from the second device as detected by the awareness component of the second device. In some embodiments, the method may also include determining a distance between the first device and the second device, and comparing the determined distance to a threshold distance. The threshold distance may be associated with the requested awareness information and may vary based on the type of the requested awareness information. To determine the distance between the first device and the second device, the method may include identifying at least one attribute of a communications path between the first device and the second device, and then determining the distance based on the at least one identified attribute of the communications path.

In other embodiments, there is provided an electronic device that may include an awareness component, communications circuitry, and control circuitry coupled to the awareness component and the communications circuitry. The control circuitry may be operative to receive a request from another electronic device for awareness information associated with a threshold distance and to direct the awareness component to capture the requested awareness information. The control circuitry may also be operative to determine that a distance between the electronic device and the other electronic device is less than the threshold distance and to direct the communications circuitry to transmit the captured awareness information to the other electronic device in response to the determination. In some embodiments, the control circuitry may be operative to determine the position of the electronic device, to determine the position of the other electronic device, and then to determine the distance between the electronic device and the other electronic device based on the determined positions. Additionally or alternatively, the control circuitry may be operative to direct the communications circuitry to establish a communications path with the other electronic device, to determine at least one characteristic of the communications path, and to determine the distance between the electronic device and the other electronic device based on the at least one determined characteristic of the communications path. In some embodiments, the control circuitry may also be operative to determine position information associated with the electronic device and to direct the communications circuitry to transmit the captured awareness information with the determined position information to the other electronic device. The awareness component may include at least one of positioning circuitry, an ambient light sensor, a proximity sensor, a motion sensing component, a thermometer, a pressure sensor, a strain gauge, a microphone, a camera or other imaging sensor, a compass or magnetometer, a shock sensor, a humidity sensor, RF sensing circuitry, a magnetic strip reader, near field communications (NFC) circuitry, or any other suitable sensor.

In yet some other embodiments, there is provided another method for sharing awareness information. The method may include receiving awareness information broadcast by a first device at a second device. The first device may include an awareness component operative to acquire the awareness information. The method may also include determining a distance between the first device and the second device, comparing the determined distance with a threshold distance associated with the received awareness information to determine whether the determined distance is less than the threshold distance, and, in response to determining that the determined distance is less than the threshold distance, performing a first operation with the second device using the received awareness information. In some embodiments, in response to determining that the determined distance is not less than the threshold distance, the method may also include disregarding the received awareness information with the second device. Alternatively, in response to determining that the determined distance is not less than the threshold distance, the method may also include performing a second operation with the second device using the received awareness information until new awareness information is received at the second device from a third device that is closer to the second device than the second device is to the first device.

In still yet some other embodiments, there is provided a method for checking in with a calendar system. The method may include determining with a first device that a current time corresponds to a time of a scheduled meeting and then retrieving with the first device current location awareness information from a second device that is in geographic proximity of the first device. The method may also include transmitting the retrieved current location awareness information from the first device to the calendar system. Alternatively, the method may include transmitting the retrieved current location awareness information from the second device to the calendar system. In some embodiments, the method may also include checking in the first device with the calendar system if the retrieved current location awareness information corresponds to a location associated with the scheduled meeting.

In still yet some other embodiments, there is provided computer readable media for accessing awareness information with a non-aware electronic device. The computer readable media may include computer readable program logic recorded on the computer readable media for receiving a request for the awareness information and for determining that the non-aware electronic device does not include an awareness component corresponding to the requested awareness information. The computer readable media may also include computer readable program logic recorded on the computer readable media for identifying an aware electronic device in physical proximity of the non-aware electronic device that does include an awareness component corresponding to the requested awareness information, and for receiving from the aware electronic device the requested awareness information that is detected by the awareness component of the aware electronic device.

BRIEF DESCRIPTION OF THE DRAWINGS

The above and other aspects of the invention, its nature, and various features will be more apparent upon consideration of the following detailed description, taken in conjunction with the accompanying drawings, in which like reference characters may refer to like parts, and in which.

DETAILED DESCRIPTION

Systems, methods, and computer-readable media for sharing awareness information between devices are provided and described with reference to FIGS. 1-10.

Some electronic devices can include particular sensors or other suitable awareness components that may detect awareness information, which may be indicative of one or more characteristics of the surrounding environment or of the device status within the surrounding environment. This awareness information can in turn be used by such aware devices to perform particular operations. For example, location awareness information can be used to log into or authenticate electronic systems, access location-specific information, or retrieve content relevant to a particular location. In some cases, a device that does not include the awareness component necessary for detecting particular awareness information (i.e., a non-aware device) nevertheless may receive the awareness information. To do so, the non-aware device can establish a communications path with another device having the necessary awareness component (i.e., an aware device), and can receive the awareness information from the aware device via the communications path.

Figure 1:
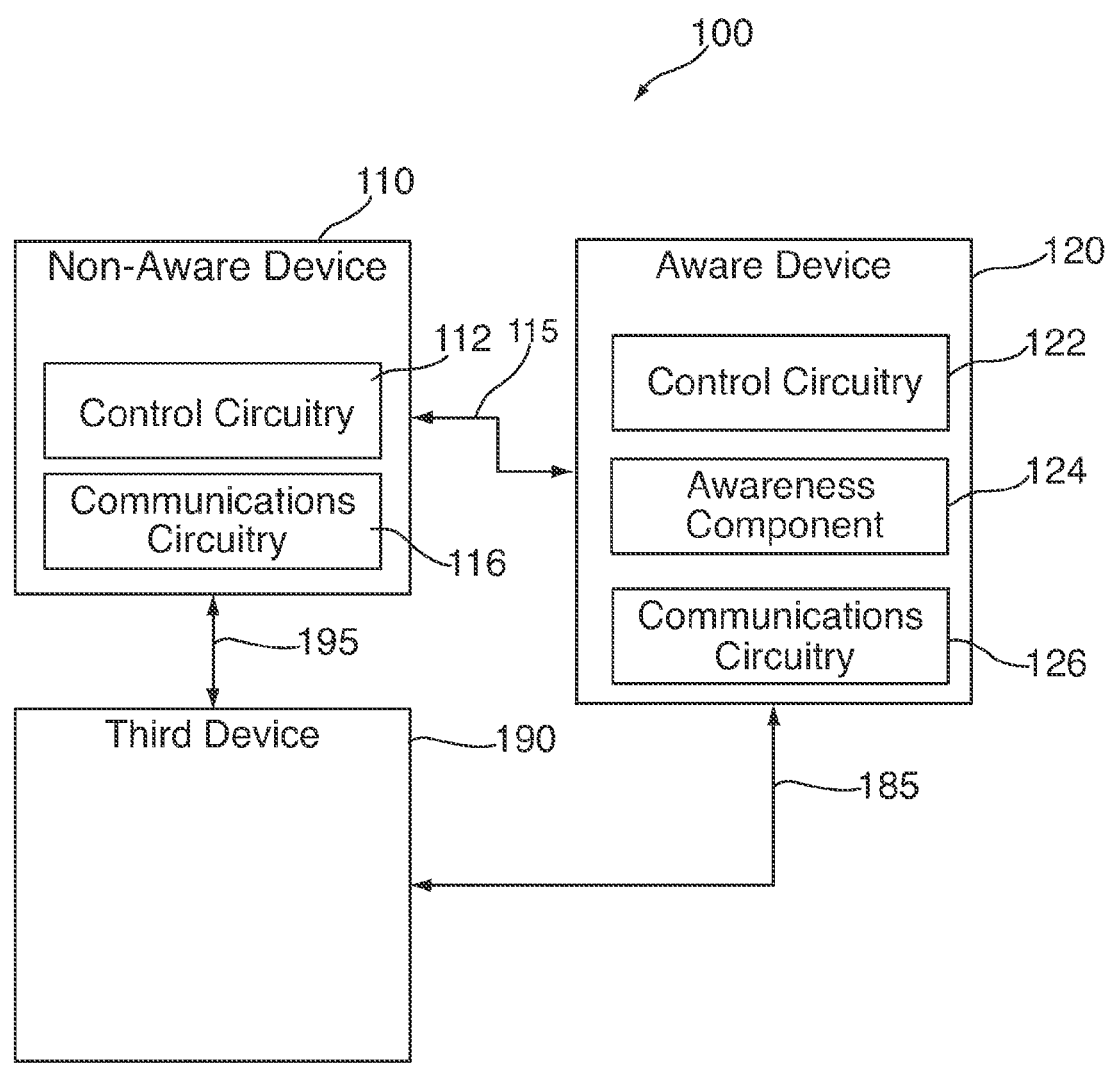
FIG. 1 is a block diagram of an illustrative system including a non-aware device in communication with an illustrative aware device in accordance with some embodiments of the invention.

FIG. 1 is a block diagram of an illustrative system 100 that may include a non-aware electronic device 110 in communication with an aware electronic device 120 in accordance with some embodiments of the invention. Non-aware device 110 can include control circuitry 112 that may be operative to enable non-aware device 110 to perform one or more operations. Aware device 120 can include control circuitry 122 that may be operative to enable aware device 120 to perform one or more operations. Aware device 120 can also include one or more awareness components 124 that may be operative to detect or otherwise acquire and process awareness information. Non-aware device 110 may also include communications circuitry 116 and aware device 120 may also include communications circuitry 126, which may allow information to be communicated between the devices over a communications path 115. In some embodiments, more than one aware device and/or more than one non-aware device may be included in system 100, each of which may share information with at least one other device in system 100 over a communications path.

Figure 2:
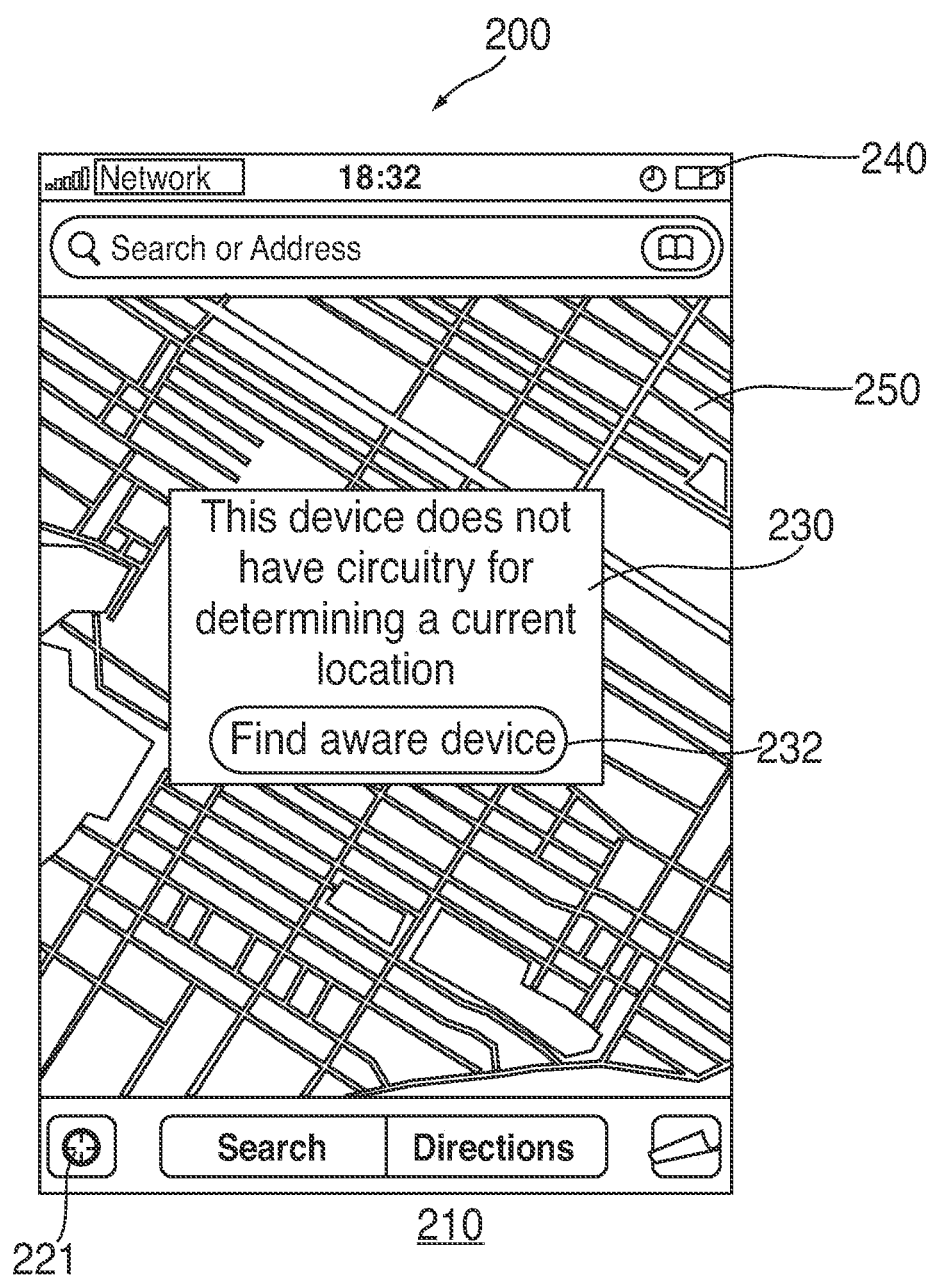
FIG. 2 is a view of an illustrative display of a non-aware device for requesting awareness information in accordance with some embodiments of the invention.

A non-aware device can receive a request for awareness information using any suitable approach. For example, a non-aware device can operate an application that requires awareness information. As another example, a user of a non-aware device can instruct the non-aware device to display awareness information. FIG. 2 is a view of an illustrative display 200 of a non-aware device 210 for requesting awareness information in accordance with some embodiments of the invention. In particular, the interface of display 200 of FIG. 2 can be provided by a non-aware device 210 that may lack the one or more awareness components that may be required for determining a current location of the device. For example, device 210 may be substantially similar to non-aware device 110 of FIG. 1. As shown in FIG. 2, for example, display 200 can include a title bar 240 and content 250 that may correspond to an interface of a map application being run by device 210. A user can direct non-aware device 210 to determine its current location using any suitable approach including, for example, by selecting a location option 221. In response to receiving an instruction to identify the current location of device 210, or more generally to retrieve awareness information for which device 210 lacks a corresponding awareness component, device 210 can provide an indication to the user that such information is not directly available. For example, non-aware device 210 can display a menu 230 that may indicate to the user that device 210 lacks the appropriate awareness component to detect its current location awareness information.

To allow device 210 to become aware of its location, display 200 can provide an option 232 by which non-aware device 210 can identify an aware device having the requested location awareness information. In response to receiving an instruction to identify an aware device (e.g., a selection of option 232), non-aware device 210 can identify one or more suitable aware devices having an awareness component for determining the location of device 210. More generally, device 210 can identify one or more aware devices (e.g., aware device 120 of FIG. 1) that have an awareness component corresponding to the awareness information requested by device 210. Non-aware device 210 can then retrieve the awareness information from the identified aware device over a communications path (e.g., communications path 115 of FIG. 1).

In some embodiments, a non-aware device can identify one or more specific aware devices trusted by a user of the non-aware device, and from which received awareness information can be used. A user of a non-aware device can define particular aware devices to trust using any suitable approach including, for example, by selecting devices from a list, entering identifying information of devices, or authorizing particular devices once communications paths with the devices are established.

A non-aware device can establish a communications path with one or more aware devices using any suitable approach. In some embodiments, the non-aware device can monitor one or more communications networks for aware devices in response to receiving a request for awareness information. The particular communications networks monitored can be selected using any suitable approach including, for example, selecting based on the networks or communications paths available to the device, the type of awareness information requested, the availability of networks (e.g., whether airplane mode is enabled), or combinations of these.

Awareness information can be provided to the non-aware device using any suitable approach. In some embodiments, the non-aware device can transmit a request for awareness information to other devices, and await responses from aware devices. An aware device, in response to receiving a request, can establish a communications path with the requesting non-aware device, and can provide the requested information. In some embodiments, aware devices can broadcast awareness information that non-aware devices can monitor. For example, a particular location can include an aware beacon device that may broadcast the location awareness information output by its awareness components for use by one or more non-aware devices that may receive the broadcasted awareness information. The broadcast awareness information can be provided at any suitable interval including, for example, at timed intervals (e.g., every 30 seconds, or every minute), based on a number of non-aware devices detected by the aware beacon device, based on a number or frequency of received requests from non-aware devices, or combinations of these.

Figure 3:
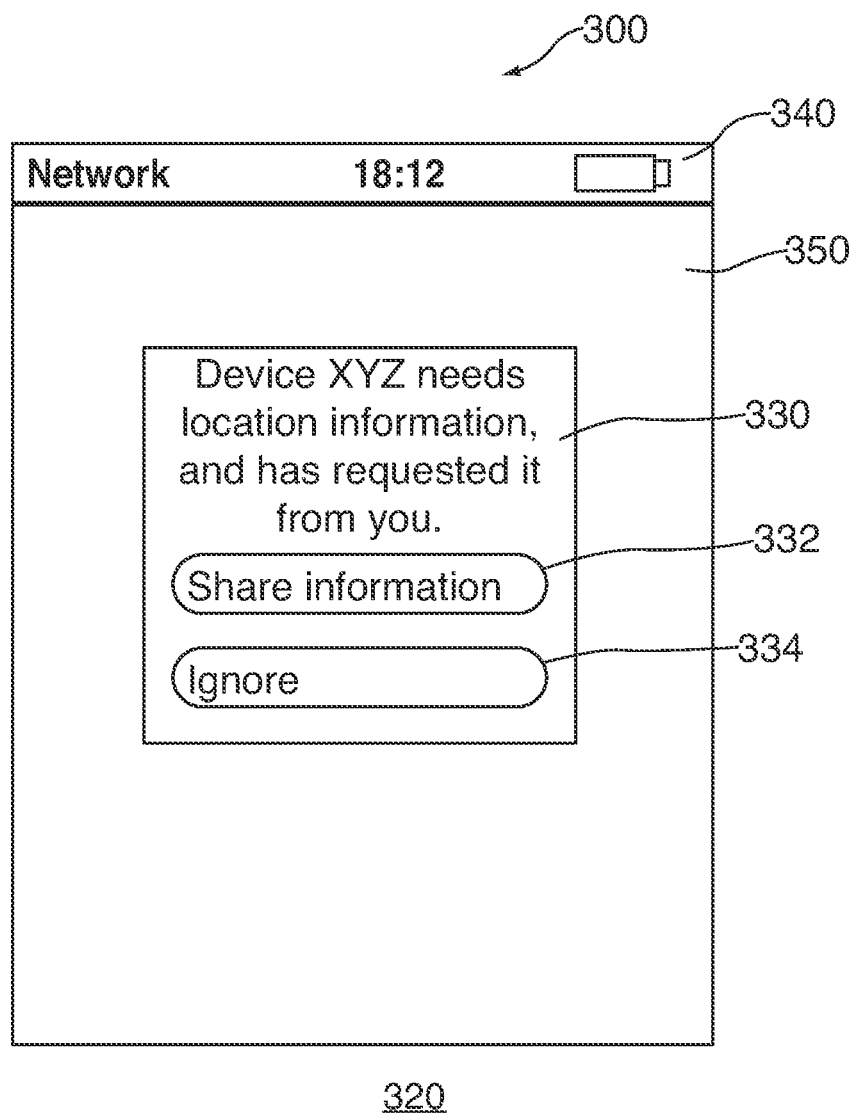
FIG. 3 is a view of an illustrative display of an aware device for providing awareness information to a non-aware device in accordance with some embodiments of the invention.

Several approaches can be used by an aware electronic device to determine whether or how to provide awareness information to non-aware devices. In some embodiments, an aware device can display an interface prompting a user to allow or disallow the transmission of awareness information to other devices. FIG. 3 is a view of an illustrative display 300 of an aware device 320 for providing awareness information to a non-aware device in accordance with some embodiments of the invention. For example, device 320 may be substantially similar to aware device 120 of FIG. 1. As shown in FIG. 3, for example, display 300 can include title bar 340 and content 350 that may correspond to an interface of an application being run by device 320. In response to receiving a request for awareness information from a non-aware device (e.g., non-aware device 110 and/or non-aware device 210), aware device 320 can display a menu 330 on display 300 that may inform the user of aware device 320 that a non-aware device is requesting awareness information. In some cases, menu 330 can identify the requesting non-aware device (e.g., "device XYZ"). Menu 330 can include an option 332 for authorizing aware device 320 to share the requested awareness information, and an option 334 for ignoring the request for awareness information. When aware device 320 receives a selection of option 334, device 320 can ignore the request and not provide any awareness information to a requesting non-aware device. However, when aware device 320 receives a selection of option 332, device 320 can establish a communications path (e.g., communications path 115 of FIG. 1) with the requesting non-aware device, and can transmit the requested awareness information via the established communications path. Alternatively, aware device 320 can broadcast the requested awareness information to all devices in communications range of aware device 320 in response to receiving a selection of option 332.

In some embodiments, an aware device can automatically provide awareness information to a non-aware device without requiring an intervening user input. For example, an aware device (e.g., device 120 and/or device 320) can automatically provide awareness information to all requesting devices. As another example, an aware device can automatically provide awareness information to known or authorized requesting devices. For example, an aware device can automatically provide awareness information to requesting devices to which awareness information has previously been provided. In some cases, an aware device may only provide pre-authorized types of awareness information.

In some embodiments, an aware device can automatically provide awareness information, or prompt a user to authorize providing awareness information, based on the type of communications path used between the aware device and the non-aware device (e.g., communications path 115 between non-aware device 110 and aware device 120 of FIG. 1). For example, an aware device may assume that a wired communications path implicitly with a non-aware device means that a user of the aware device trusts the non-aware device, and therefore may automatically provide awareness information over the wired communications path in response to receiving a request from the non-aware device. As another example, if a communications path is provided through a communications network that requires authentication by one or both of the aware and non-aware devices, the aware device may automatically provide requested awareness information to the non-aware device. In particular, if an aware device and a non-aware device are connected via a secure Wi-Fi network, or if an aware device and a non-aware device are connected via a Bluetooth™ network established using a secret key, awareness information may be automatically shared between the two devices. As still another example, if an aware device and a non-aware device are connected via a communications path provided through a communications network that is not secured, or does not require authentication by at least one or both of the devices, the aware device may prompt a user before authorizing the transmission of awareness information. In some cases, access to awareness information can be restricted by a password, key, or other approach for providing "gated" access.

For awareness information received at a non-aware device from an aware device to be relevant to the non-aware device, the aware and non-aware devices may need to be in proximity with each other (e.g., in physical proximity, or at least in a geographic vicinity). For example, a non-aware device and an aware device may need to be in close proximity for shared location awareness information to be relevant (e.g., location awareness information provided by an aware device to a non-aware device may not be useful to the non-aware device if the devices are 100 miles apart). As another example, a non-aware device and an aware device may need to be in very close proximity (e.g., in contact) for shared movement awareness information to be relevant (e.g., movement awareness information detected by an accelerometer of an aware device and provided by the aware device to the non-aware device may not be useful to the non-aware device if the devices did not undergo the same movement). Accordingly, a non-aware device and an aware device may need to be within a maximum threshold distance of each other to share relevant awareness information. The threshold distance can define a useful range of awareness information provided by an awareness component. In some cases, the particular threshold distance can change or vary based on the type of awareness information being shared. For example, a threshold distance for location awareness information can be larger than a threshold distance for ambient light or movement awareness information. As another example, a threshold distance associated with ambient noise awareness information can be smaller than a threshold distance associated with a camera output used for facial detection awareness information.

Figure 4:
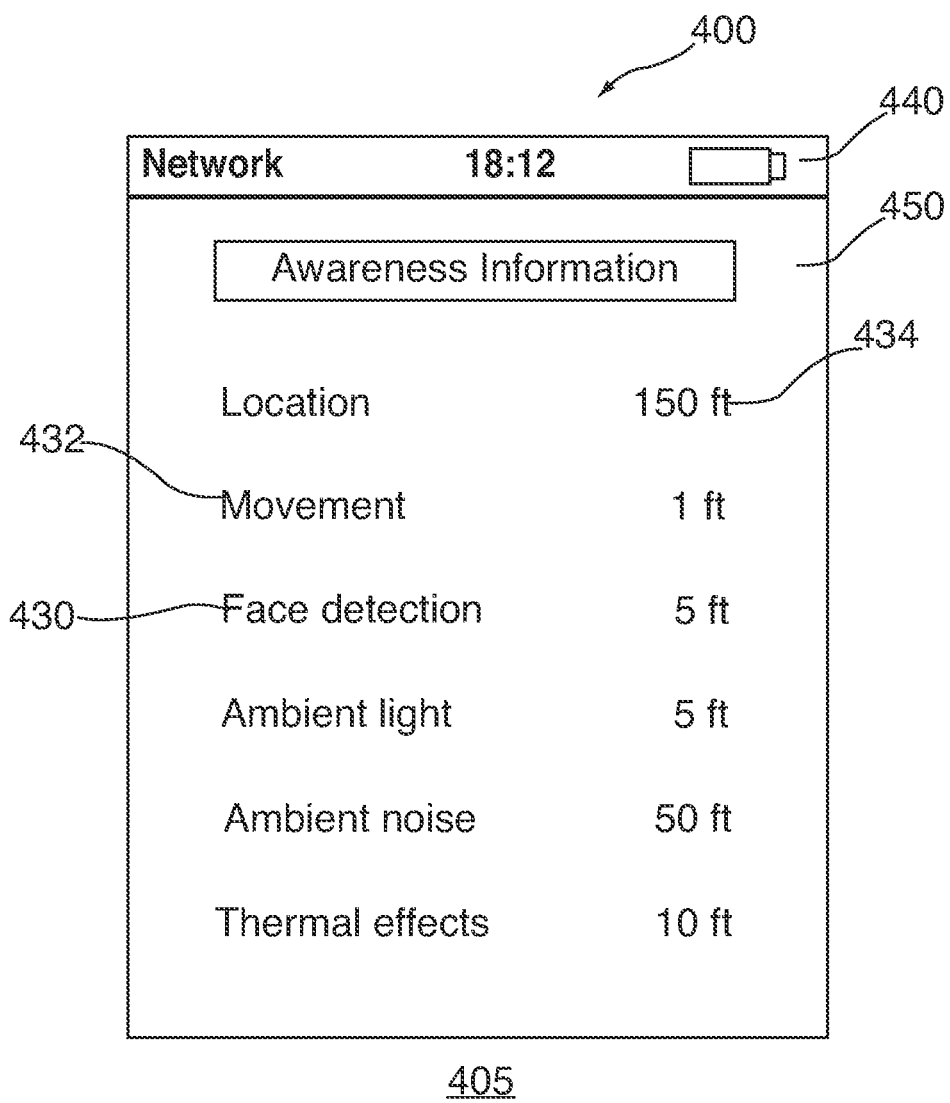
FIG. 4 is a view of an illustrative display of a device for defining threshold distances for awareness information in accordance with some embodiments of the invention.

Each type or instance of awareness information can be associated with a particular threshold distance using any suitable approach. For example, each type of awareness information can be associated with a default threshold distance. As another example, one or more types of awareness information can be associated with a user-defined or user-modified threshold distance. FIG. 4 is a view of an illustrative display 400 of a device 405 for defining threshold distances for awareness information in accordance with some embodiments of the invention. Device 405 may be an aware device (e.g., aware device 120 of FIG. 1 and/or aware device 320 of FIG. 3) to define threshold distances for transmitting awareness information, a non-aware device (e.g., non-aware device 110 of FIG. 1 and/or non-aware device 210 of FIG. 2) to define threshold distances for receiving awareness information, or a device that may be both an aware device in certain instances and a non-aware device in other instances. For example, display 400 can be used to define threshold distances for awareness information that may be transmitted by device 405 (e.g., as an aware device that may include one or more awareness components corresponding to such awareness information), and for awareness information that may be received by device 405 (e.g., as a non-aware device that may not include the one or more awareness components corresponding to such awareness information).

If an aware device and a non-aware device define different threshold distances for a particular type of awareness information requested of the aware device by the non-aware device, any of the threshold distances can govern the sharing of that particular type of requested awareness information between the devices. For example, a smaller or larger threshold distance can take priority over the other, or a threshold distance of a non-aware device or of an aware device can take priority over the other. In some cases, a combined or averaged threshold distance can be used.

As shown in FIG. 4, display 400 of device 405 can include a title bar 440 and a content region 450 that may correspond to an interface of an application being run by device 405. Content region 450 of display 400 may include a listing 430 of various types of awareness information 432 and various corresponding threshold distances 434. A user of device 405 can define or modify each threshold distance using any suitable approach including, for example, by selecting and modifying a particular listing. Display 400 can provide any suitable interface for adjusting a threshold distance. In the example of FIG. 4, the user can define a numerical value corresponding to the threshold distance. The numerical value can correspond to a measurable distance (e.g., in a distance unit such as feet), or to a relative distance (e.g., a number on a scale of 0-100). Alternatively, display 400 can provide a slider and a bar that can be dragged to change a threshold distance, or other interfaces can be used. In some cases, using display 400, a user of an aware device can define a very small or non-existent distance threshold to indicate that a corresponding type of awareness information is not to be shared.

A threshold distance can be quantified using any suitable approach. In some embodiments, a threshold distance can be measured using a distance unit such as, for example, feet, inches, meters, centimeters, millimeters, or combinations of these. In some embodiments, a threshold distance can be quantified based on properties of a communications network used by an aware device and/or a non-aware device that may be utilizing the threshold distance information. For example, a threshold distance can be defined as a number of displayed bars indicating a communications network strength (e.g., at least 3 of 4 bars in a Wi-Fi network), a signal-to-noise ratio, or another measure of signal strength. In some cases, awareness information can be associated with different measurements of signal strength for different communications networks. For example, a threshold distance can be defined as at least three of four bars of a Wi-Fi network, and at least one of four bars of a Bluetooth™ network. Alternatively, the threshold distance can be defined as a particular communications network used to share the awareness information (e.g., a threshold communications network). In such cases, the ability to establish a communications path over the particular communications network can ensure that the distance between the devices is less than the threshold distance.

In some embodiments, a threshold distance for a particular type of awareness information can be defined by a similarity in another type of awareness information acquired independently by both the aware device and the non-aware device. For example, a threshold distance associated with location awareness information requested of an aware device by a non-aware device can be defined by a similarity in ambient light awareness information detected by each device when each device includes an ambient light sensor.

As another example, a threshold distance associated with location awareness information requested of an aware device by a non-aware device can be defined by a similarity in ambient noise awareness information or any other type of environmental condition awareness information that may be detected by both the aware device and the non-aware device. As still another example, a threshold distance associated with location awareness information can be defined by a similarity in motion information detected by motion-sensing components of each device (e.g., both devices detect similar movement because both devices are in a same car).

Different approaches can be used to quantify a distance between an aware device and a non-aware device. In one approach, each one of several communications networks may be associated with at least one distance quantity (e.g., a range), such that devices can determine, based on the particular communications network being used, whether the distance quantity of the communications network is less than the threshold distance associated with particular requested awareness information. In some embodiments, a particular communications network can be associated with several distance quantities, for example, based on the strength of signals transmitted through the communications network (e.g., a stronger signal may be associated with a shorter distance, and a weaker signal may be associated with a longer distance), although other attributes or characteristics of a communications network can be extrapolated to define a distance between the devices.

Other approaches can be used to determine whether an aware device and a non-aware device are within a threshold distance of each other. In some embodiments, the devices can determine their positions relative to each other using location information from positioning circuitry of each device, if available. Alternatively or additionally, one or both of the devices can capture an image using an appropriate sensor (e.g., a camera) in which the other device can be detected and identified. For example, by measuring the size of the other device in the captured image, a device capturing the image can determine a distance separating the devices. As yet another example, an ambient light sensor or proximity sensor can be used to determine whether two devices are placed in contact with or in proximity to each other. As still yet another example, a user of an aware device and/or a user of a non-aware device can provide an indication that the devices are within a threshold distance of one another for particular awareness information.

In some cases, a criteria other than distance can be used to determine whether awareness information captured by an aware device is relevant for a non-aware device. Different criteria can be used for different types of awareness information. For example, the criteria can include orienting devices towards a same event or source of awareness information (e.g., audio awareness information captured by a microphone of an aware device can be considered relevant to a non-aware device if both devices are oriented towards a same audio source). As another example, a time of day, software package or operation of a device, or a broadcast of an impaired state of a known device can be used as criteria. For the simplicity of the following discussion, however, the criteria used will be limited to distance-based criteria.

A non-aware device can perform any suitable operation with awareness information received from a device that is beyond the threshold distance associated with the awareness information. In some cases, a non-aware device can ignore such awareness information. Alternatively, if no other awareness information is available from a device within the threshold distance, the non-aware device can make use of the received awareness information, for example, until other awareness information is received from a device within the threshold distance. In some embodiments, the non-aware device can determine the reliability (e.g., the usability or accuracy) of awareness information based on the distance of the device providing the awareness information, and can rely less significantly on awareness information having a low reliability.

An aware device can share awareness information captured from any suitable awareness component of the aware device. In particular, awareness information can be captured by one or more of positioning circuitry, an ambient light sensor, a motion detection component, a camera, a microphone, a thermometer, a pressure sensor or strain gauge, or combinations of these (e.g., as described with respect to device 1000 of FIG. 10). A non-aware device can perform any suitable operation that makes use of awareness information received from the aware device.

In some embodiments, a non-aware device can receive positioning awareness information from an aware device. The positioning awareness information can take any suitable form including, for example, coordinates (e.g., GPS coordinates), an address, a particular room or building, a beacon, or combinations of these. The non-aware device can perform any suitable operation using the positioning awareness information. For example, the non-aware device can operate an application that makes use of positioning awareness information, such as a mapping application, a navigation application, an application for retrieving information relating to a location (e.g., a travel guide), or perform any other suitable operation with the received positioning awareness information. In some embodiments, the non-aware device can make use of the positioning awareness information for authentication purposes.

In some embodiments, a non-aware device can receive ambient light awareness information from an ambient light sensor of an aware device. Using the received ambient light awareness information, the non-aware device can adjust screen brightness of the non-aware device, change a color palette used for displayed content on the non-aware device, or perform any other suitable operation with the received ambient light awareness information. As another example, in some embodiments, a non-aware device can receive proximity awareness information from a proximity sensor of an aware device. Using the received proximity awareness information, the non-aware device can selectively turn on or off a display of the non-aware device, enable or disable particular input interfaces of the non-aware device (e.g., ignore button presses on the non-aware device when it is determined that the non-aware device is in a user's pocket based on received ambient light awareness information or received proximity awareness information), or perform any other suitable operation with the received awareness information.

In some embodiments, a non-aware device can receive movement awareness information from a motion sensing component of an aware device. For example, an accelerometer, compass, gyroscope, or combinations of these can provide movement or orientation awareness information to a non-aware device. Using received movement awareness information, a non-aware device can determine its orientation (e.g., to change an orientation of displayed content), the amount of movement of the non-aware device (e.g., whether it is shaking intentionally), information required to stabilize or correct an output of a component of the non-aware device that is susceptible to device movement, or perform any other suitable operation with the received movement awareness information.

In some embodiments, a non-aware device can receive an image or representation of a device environment from a camera or sensor of an aware device. Using the received image or representation awareness information, the non-aware device can identify attributes of the non-aware device's environment, determine its position or orientation relative to other devices, provide virtual content overlaid on the image or representation, or perform any other suitable operation with the information.

In some embodiments, a non-aware device can receive an audio clip or audio stream captured by a microphone of an aware device. Using the received audio clip or audio stream awareness information, the non-aware device can provide voice control, perform noise canceling, detect particular users from their voice print, or perform any other suitable operation with the information.

In some embodiments, a non-aware device can receive thermal awareness information from a thermometer or other heat sensing component of an aware device. Using the received temperature or thermal awareness information, a non-aware device can adjust the operation of internal components to control heating or cooling of the non-aware device, optimize an operating temperature of the non-aware device or of any device components (e.g., a battery), or perform any other suitable operation with the received temperature or thermal awareness information.

In some embodiments, a non-aware device can receive pressure awareness information from a pressure sensor or strain gauge of an aware device. Using the received pressure awareness information, a non-aware device can perform noise cancellation (e.g., provided the received pressure awareness information is detailed enough to correspond to environmental audio), or perform any other suitable operation with the received pressure awareness information.

In some cases, a non-aware device can use received awareness information to perform particular operations locally on the non-aware device. For example, a non-aware device can perform an operation that is executed solely on the non-aware device, using data stored locally on the non-aware device based on received awareness information. In particular, a non-aware device can set a device setting or attribute based on received awareness information.

In other cases, a non-aware device can use awareness information received from an aware device to perform a particular operation that includes interactions with a third device (e.g., a third device 190 of system 100 of FIG. 1 that may communicate with non-aware device 110 via a communications path 195 and/or with aware device 120 via a communications path 185). Such a third device may be any suitable type of remote device from the non-aware device, such as a host device, server device, cloud device, or the like. In some embodiments, the third device may actually be the aware device that provided the received awareness information to the non-aware device. A non-aware device can perform an operation that is executed solely on the non-aware device, but that uses some remotely retrieved information other than the received awareness information. For example, a non-aware device can request, from a third device, updated mapping information corresponding to the current location of the non-aware device as determined by received current location awareness information from an aware device (e.g., for display by a mapping application running on the non-aware device). As another example, a non-aware device can receive from a third device a listing of points of interest that are in the vicinity of a current location of the non-aware device as determined by location awareness received by the non-aware device from an aware device. Alternatively, a non-aware device can direct a remote device to perform an operation based on awareness information received by the non-aware device from an aware device. For example, a non-aware device can check in with a remote service from a particular location or a meeting, pick a remote server or mirror from which to access content, retrieve content created or generated near the received location (e.g., photos or videos captured in the same place), or any other operation involving a remote source. In particular, a non-aware device of a user attending a meeting can receive location awareness information from an aware device of another user attending the same meeting, and can then check in with a calendar system using the received location awareness information. A similar approach can be used for classrooms to monitor class attendance.

As another example, a non-aware device can provide audio awareness data received from a microphone of an aware device to a remote source for processing. The remote source can perform any suitable operation including, for example, providing captured audio of played back media to a remote system for identifying the played back media. As another example, a non-aware device can provide received audio awareness information to a voice processing service to identify a user providing a voice instruction, or to identify specific words or terms spoken by a user.

As still another example, a non-aware device can provide awareness information received from an accessory of an aware device to a remote source for processing. In one case, awareness information output from a running or athletic accessory of an aware device can be provided to and received by a non-aware device, which can then share that received awareness information to a tracking or monitoring service used to monitor workout progress. In another case, an output corresponding to a heart monitor can be provided to a service monitoring a heart rate for health purposes. In some embodiments, information from any other aware device accessory can be provided to a non-aware device that may then pass on the received awareness information to a remote source.

In some embodiments, instead of retrieving awareness information from an aware device, a non-aware device can retrieve operation or process information from an aware device. In particular, a non-aware device can identify processes executed by an aware device and retrieve variables or criteria used to operate the process. The variables or criteria can then be used to operate the same process or a related process using the non-aware device. This approach may be of interest, for example, when a user of a non-aware device can assume that close proximity with an aware device indicates that the operations of the aware device will be of interest or relevant to the user. For example, a non-aware device can perform a same operation as an aware device (e.g., open a same internet radio station using a same seed, or generate a media playlist based on the same seed), or share content with the aware device (e.g., download content to the aware device when the non-aware device has limited storage capabilities, or vice versa). As another example, a non-aware device can retrieve a power use profile or other operating information of an aware device and tailor the performance of the non-aware device correspondingly (e.g., limit power consumption when another device is consuming a lot of power so that at least the non-aware device may have power when the aware device runs out).

Figure 5:
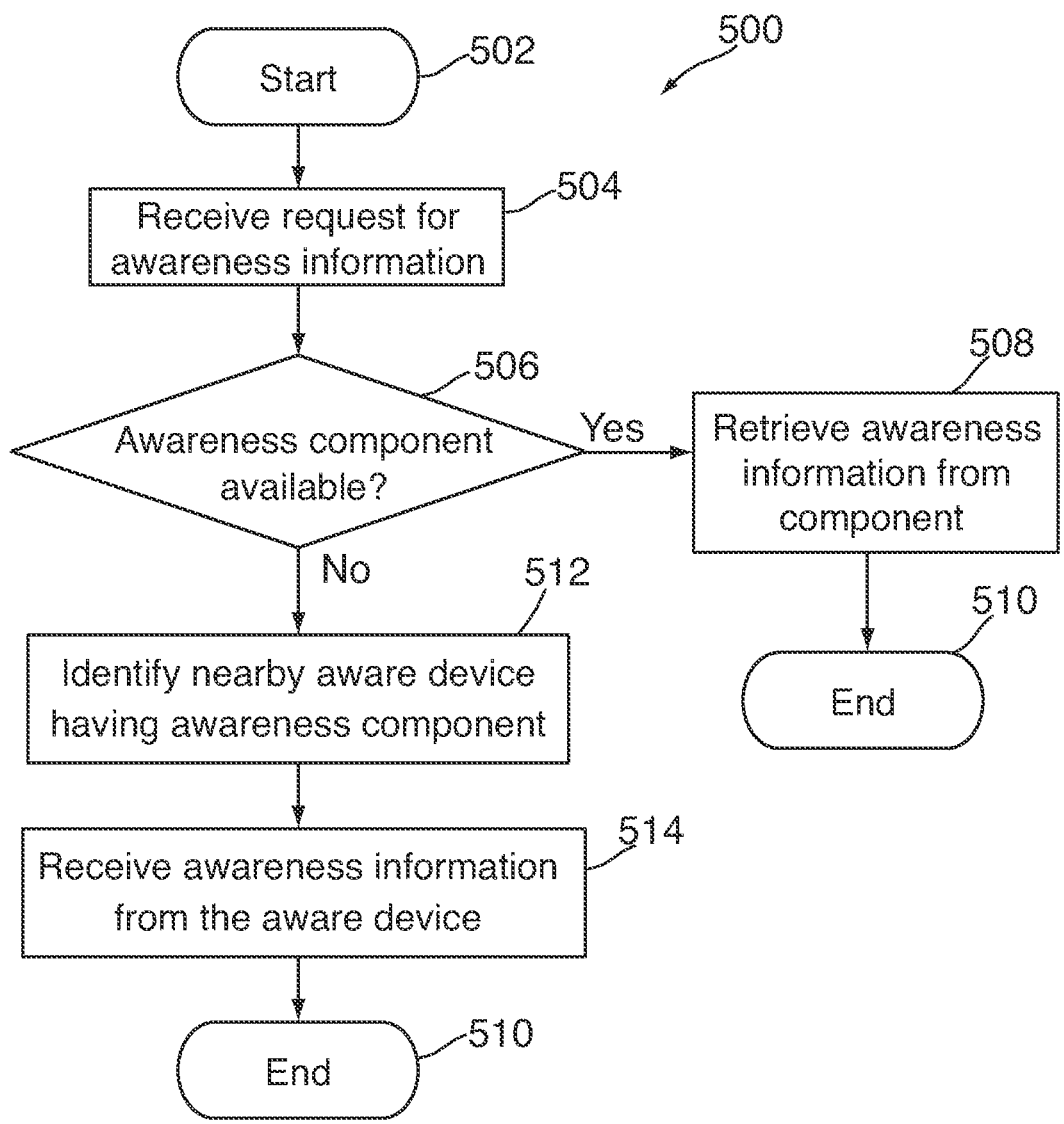
FIG. 5 is a flowchart of an illustrative process for retrieving awareness information in accordance with some embodiments of the invention.

FIG. 5 is a flowchart of an illustrative process 500 for retrieving awareness information from an aware device in accordance with some embodiments of the invention. Process 500 can begin at step 502. At step 504, an electronic device can receive a request for awareness information. For example, an application operating on the device can require information regarding an environment of the device. At step 506, the device can determine whether the device includes an awareness component that is available in the device to detect the requested awareness information. If the electronic device determines that such an awareness component is available, process 500 can move to step 508. At step 508, the electronic device can retrieve the awareness information from the available awareness component and end at step 510.

If, at step 506, the electronic device instead determines that no such awareness component is available, process 500 can move to step 512. At step 512, the electronic device can identify at least one nearby aware device that includes such an awareness component for detecting the requested awareness information. In some cases, the electronic device can determine the proximity of the aware device to the electronic device. At step 514, the electronic device can receive the requested awareness information from the aware device. For example, the electronic device can receive the requested awareness information over a communications path established with the aware device. Process 500 can then end at step 510.

Figure 6:
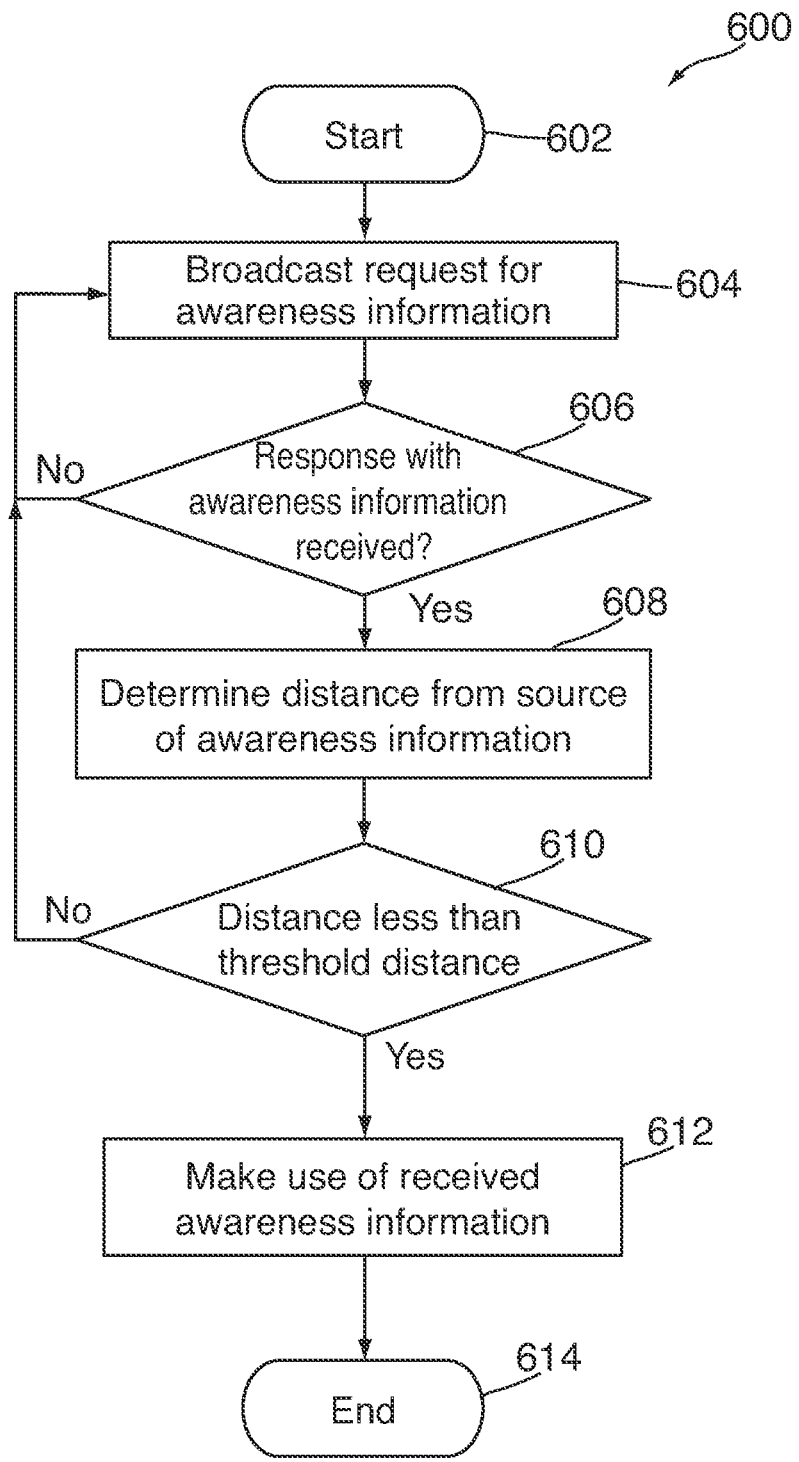
FIG. 6 is a flowchart of an illustrative process for receiving awareness information based on a distance in accordance with some embodiments of the invention.

FIG. 6 is a flowchart of an illustrative process 600 for receiving awareness information based on a distance between devices in accordance with some embodiments of the invention. Process 600 can begin at step 602. At step 604, an electronic device can broadcast a request for awareness information. For example, a non-aware device can broadcast a request for awareness information that the non-aware device cannot detect on its own, for example, because the device lacks one or more corresponding awareness components. At step 606, the requesting electronic device can determine whether a response with the requested awareness information was received. For example, the requesting electronic device can determine whether another device (e.g., an aware device having an awareness component corresponding to the requested awareness information) has provided the requested awareness information to the requesting device. If the requesting electronic device determines that no awareness information has been received, process 600 can return to step 604 and continue to broadcast a request for awareness information.

If, at step 606, the requesting electronic device instead determines that a response to the request was received, process 600 can move to step 608. At step 608, the requesting electronic device can determine a distance from the source of the received awareness information. The requesting electronic device can determine the distance using any suitable approach including, for example, based on attributes of a communications path, positioning information, similarities in sensor output, or combinations of these. At step 610, the electronic device can determine whether the distance is less than a threshold distance (e.g., a threshold distance associated with the requested awareness information). If the requesting electronic device determines that the distance is not less than a threshold distance, process 600 can return to step 604 and continue to broadcast a request for awareness information.

If, at step 610, the requesting electronic device instead determines that the determined distance is less than the threshold distance, process 600 can move to step 612. At step 612, the requesting electronic device can make use of the received awareness information (e.g., to operate a process that uses the awareness information). Process 600 can then end at step 614.

Figure 7:
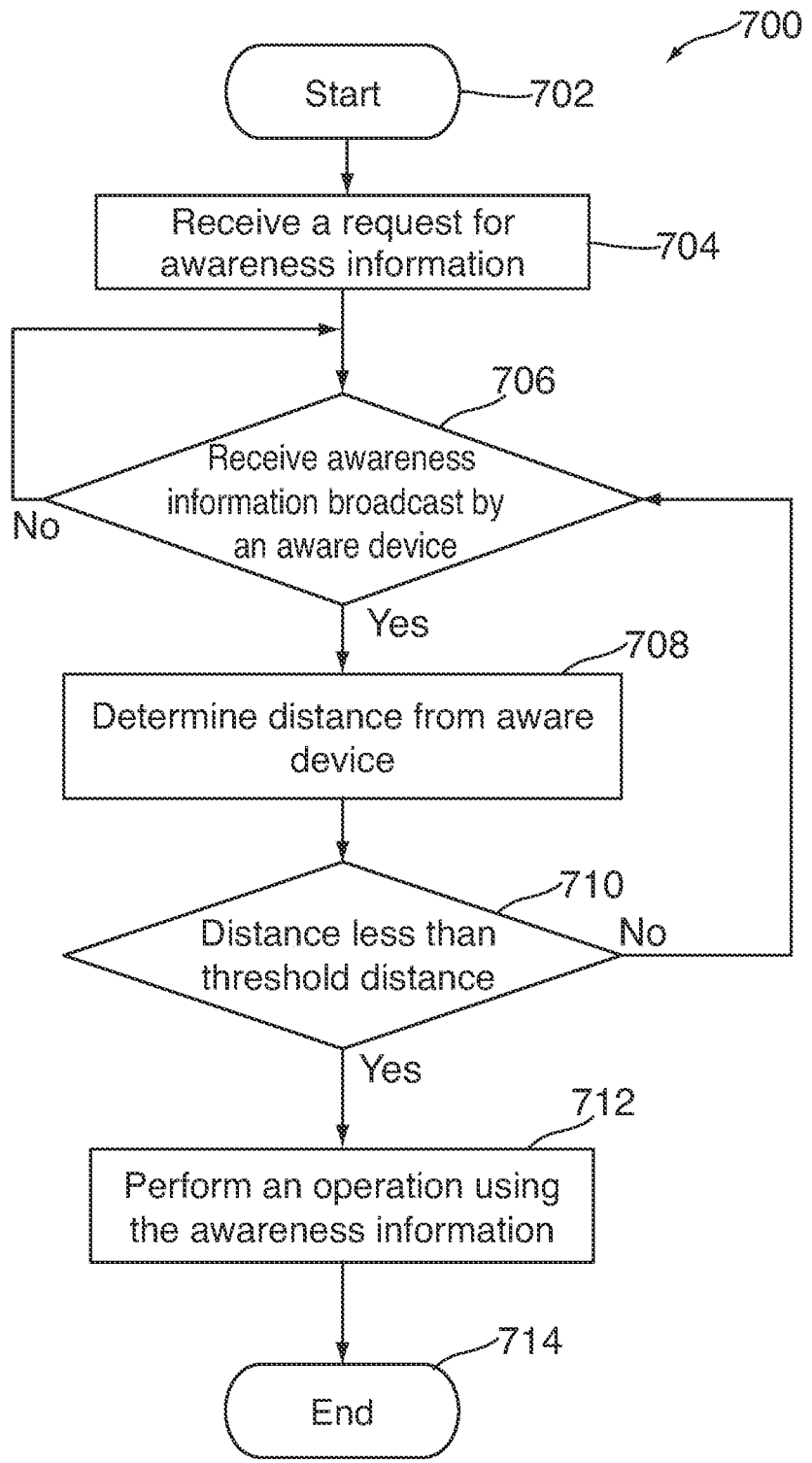
FIG. 7 is a flowchart of an illustrative process for receiving awareness information based on a distance in accordance with some embodiments of the invention.

FIG. 7 is a flowchart of an illustrative process 700 for receiving broadcast awareness information in accordance with some embodiments of the invention. Process 700 can begin at step 702. At step 704, an electronic device can receive a request for awareness information. At step 706, the electronic device can determine whether awareness information broadcast by an aware device was received by the electronic device. If the electronic device determines that no broadcast of the requested awareness information has been received, process 700 can return to step 706 and continue to monitor for broadcasts of the requested awareness information.

If, at step 706, the electronic device instead determines that broadcast awareness information was received, process 700 can move to step 708. At step 708, the electronic device can determine a distance from the source of the received awareness information. The electronic device can determine the distance using any suitable approach including, for example, based on attributes of a communications path, positioning information, similarities in sensor output, or combinations of these. At step 710, the electronic device can determine whether the distance is less than a threshold distance. If the electronic device determines that the distance is not less than a threshold distance, process 700 can return to step 706 and continue to monitor for broadcasts of the requested awareness information.

If, at step 710, the electronic device instead determines that the determined distance is less than the threshold distance, process 700 can move to step 712. At step 712, the electronic device can perform an operation using the received awareness information. Process 700 can then end at step 714.

Figure 8:
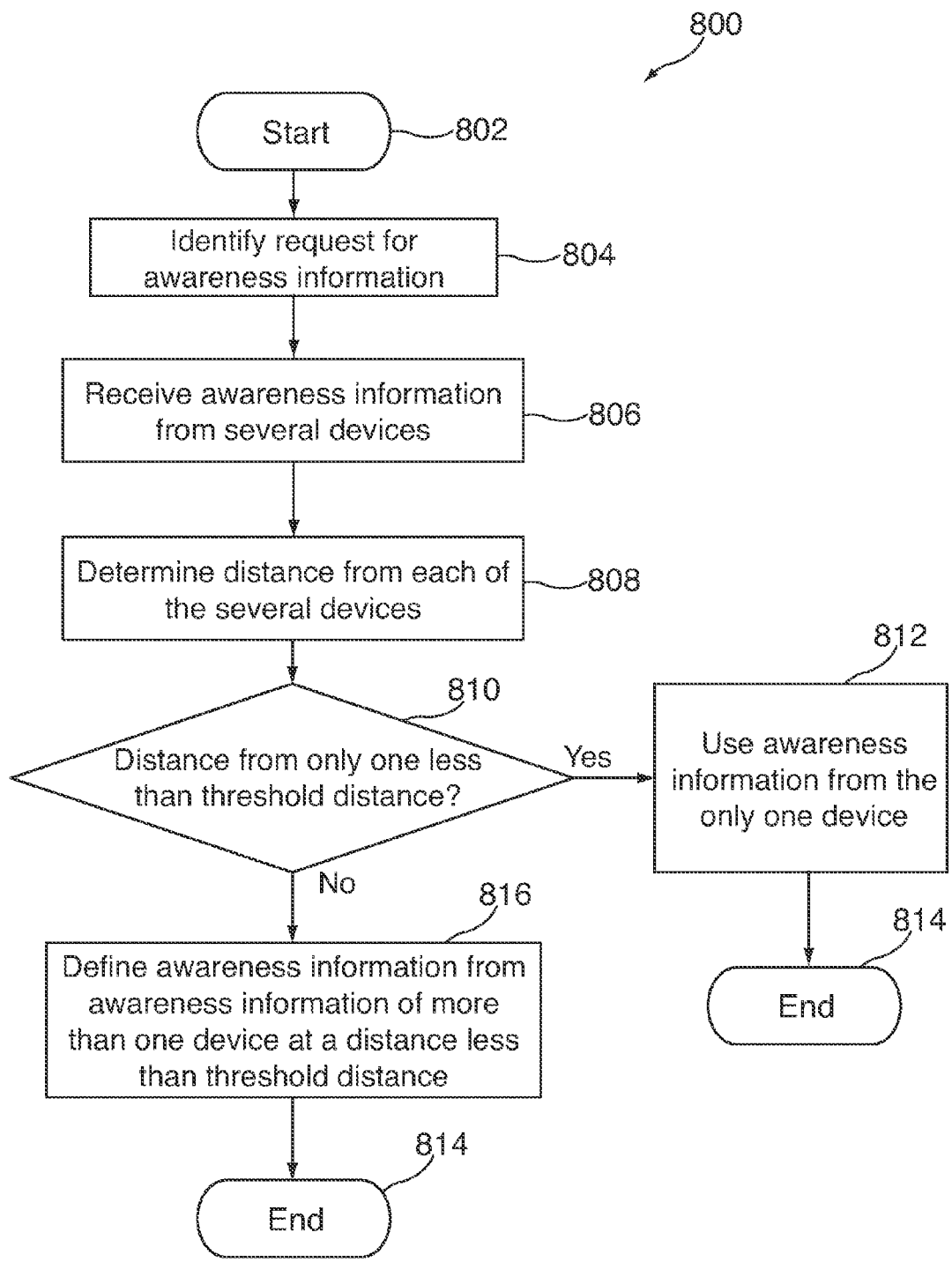
FIG. 8 is a flowchart of an illustrative process for selecting awareness information received from several devices in accordance with some embodiments of the invention.

FIG. 8 is a flowchart of an illustrative process 800 for selecting awareness information received from several devices in accordance with some embodiments of the invention. Process 800 can begin at step 802. At step 804, an electronic device can receive a request for awareness information. At step 806, the electronic device can receive the requested awareness information from several devices. For example, several aware devices can provide the requested awareness information to the electronic device. At step 808, the electronic device receiving the awareness information can determine a distance to each of the several devices. The electronic device can determine each of the distances using any suitable approach including, for example, based on attributes of a communications path, positioning information, similarities in sensor output, or combinations of these.

At step 810, the electronic device can determine whether the distance from only one of the several devices is less than a threshold distance. If the electronic device determines that the distance to only one of the several devices is less than a threshold distance, process 800 can move to step 812. At step 812, the electronic device can use only the awareness information received from only the one of the several devices determined at step 810. For example, the electronic device may use a single instance of the received awareness information. Process 800 can then end at step 814.

If, at step 810, the electronic device instead determines that the distance from more than one of the several devices is less than the threshold distance, process 800 can move to step 816. At step 816, the electronic device can define working awareness information from instances of awareness information received from at least two of the several devices. For example, the electronic device can select the awareness information received from one of the several devices determined at step 810 using any suitable approach (e.g., choosing the device with the distance closest to the threshold or the lowest distance), merge some or all of the received awareness information to form a combined working awareness information, or any combinations of these. The electronic device can then use the defined working awareness information to perform one or more operations. Process 800 can then end at step 814.

Figure 9:
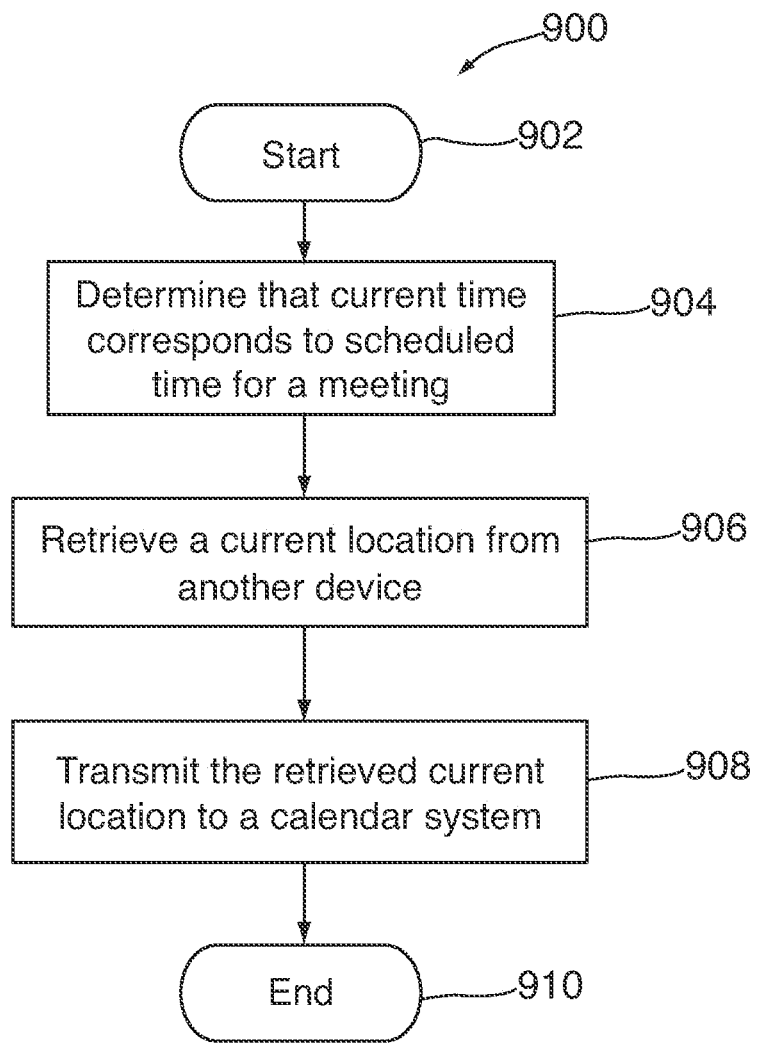
FIG. 9 is a flowchart of an illustrative process for interacting with a calendar system in accordance with some embodiments of the invention.

The following illustrates a process by which a non-aware device may use location awareness information in a specific context. FIG. 9 is a flowchart of an illustrative process 900 for checking in with a calendar system in accordance with some embodiments of the invention. Process 900 can begin at step 902. At step 904, an electronic device can determine that a current time corresponds to a time of a scheduled meeting. For example, the electronic device can refer to a calendar stored by or accessible to the device to identify upcoming or ongoing meetings on the calendar. At step 906, the electronic device can retrieve the current location of the device from another device. The other device can be in geographic proximity of the retrieving device to ensure that the retrieved current location is relevant to the retrieving device. For example, the retrieving device may be a non-aware device that does not include an awareness component capable of detecting current location awareness information indicative of the current location of the non-aware device. The other device may be an aware device that includes such an awareness component and that may communicate detected current location awareness information to the non-aware device, as described above. At step 908, the retrieving electronic device can transmit the retrieved current location awareness information to the calendar system. The calendar system can check in the retrieving device if the retrieved current location awareness information corresponds to a location associated with the scheduled meeting. In some cases, the retrieving electronic device can additionally transmit information identifying the scheduled meeting or the current time to the calendar system as part of the check-in process. Alternatively, the other electronic device may transmit the detected current location awareness information directly to the calendar system (e.g., and not via the retrieving electronic device). Process 900 can end at step 910.

Figure 10:
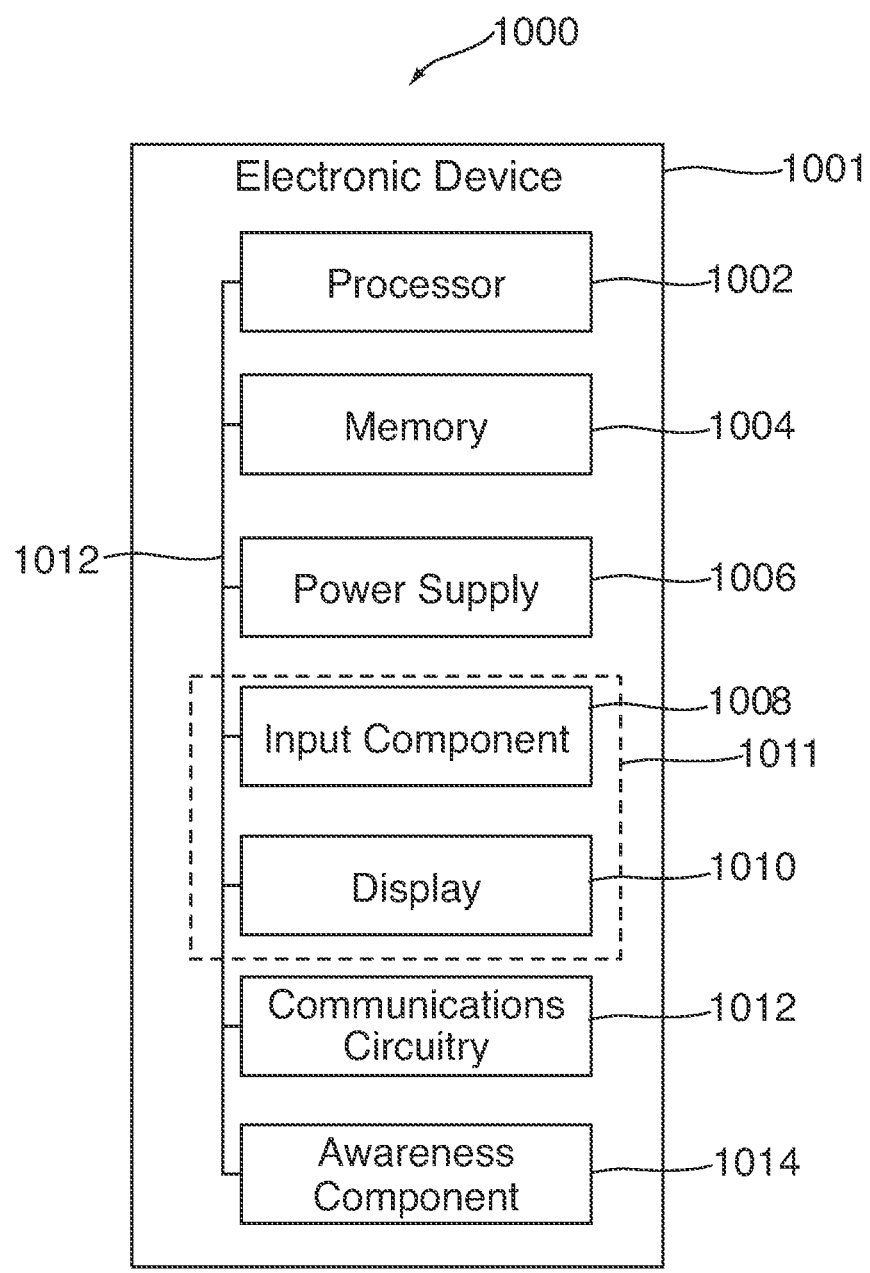
FIG. 10 is a block diagram of an illustrative electronic device in accordance with some embodiments of the invention.

Any suitable electronic device can be used as an aware device (e.g., aware device 120, 320, and/or 405), a non-aware device (e.g., non-aware device 110, 210, and/or 405), or a third device (e.g., third device 190). For example, FIG. 10 is a schematic view of an illustrative electronic device 1000 that may be an aware device, a non-aware device, and/or a third device for sharing or otherwise utilizing awareness information in accordance with some embodiments of the invention. Electronic device 1000 may be any portable, mobile, or hand-held electronic device configured to transmit, receive, and/or present to a user awareness information or information derived from awareness information wherever the user travels. Alternatively, electronic device 1000 may not be portable at all, but may instead be generally stationary. Electronic device 1000 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 1000 may perform a single function (e.g., a device dedicated to sharing awareness information) and, in other embodiments, electronic device 1000 may perform multiple functions (e.g., a device that shares awareness information, plays music, and receives and transmits telephone calls).

Electronic device 1000 may include a processor or control circuitry 1002, memory 1004, power supply 1006, input component 1008, display 1010, communications circuitry 1012, and awareness component 1014. Electronic device 1000 may also include a bus 1016 that may provide one or more wired or wireless communication links or paths for transferring data and/or power to, from, or between various other components of device 1000. In some embodiments, one or more components of electronic device 1000 may be combined or omitted. Moreover, electronic device 1000 may include other components not combined or included in FIG. 10 and/or several instances of one or more of the components shown in FIG. 10.

Memory 1004 may include one or more storage mediums, including for example, a hard-drive, flash memory, non-volatile memory, permanent memory such as read-only memory ("ROM"), semi-permanent memory such as random access memory ("RAM"), any other suitable type of storage component, or any combination thereof.

Memory 1004 may include cache memory, which may be one or more different types of memory used for temporarily storing data for electronic device application programs. Memory 1004 may store media data (e.g., music and image files), software (e.g., a boot loader program, one or more application programs of an operating system for implementing functions on device 1000, etc.), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 1000 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Power supply 1006 may provide power to one or more of the components of device 1000. In some embodiments, power supply 1006 can be coupled to a power grid (e.g., when device 1000 is not a portable device, such as a desktop computer). In some embodiments, power supply 1006 can include one or more batteries for providing power (e.g., when device 1000 is a portable device, such as a cellular telephone). As another example, power supply 1006 can be configured to generate power from a natural source (e.g., solar power using solar cells).

One or more input components 1008 may be provided to permit a user to interact or interface with device 1000. For example, input component 1008 can take a variety of forms, including, but not limited to, an electronic device pad, dial, click wheel, scroll wheel, touch screen, one or more buttons (e.g., a keyboard), mouse, joy stick, track ball, microphone, camera, proximity sensor, light detector, and combinations thereof. Each input component 1008 can be configured to provide one or more dedicated control functions for making selections or issuing commands associated with operating device 1000.

Electronic device 1000 may also include one or more output components that may present information (e.g., visual, audible, and/or tactile information) to a user of device 1000. An output component of electronic device 1000 may take various forms, including, but not limited to, audio speakers, headphones, audio line-outs, visual displays, antennas, infrared ports, rumblers, vibrators, or combinations thereof.

For example, electronic device 1000 may include display 1010 as an output component. Display 1010 may include any suitable type of display or interface for presenting visual content to a user. In some embodiments, display 1010 may include a display embedded in device 1000 or coupled to device 1000 (e.g., a removable display). Display 1010 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 1010 can include a movable display or a projecting system for providing a display of content on a surface remote from electronic device 1000, such as, for example, a video projector, a head-up display, or a three-dimensional (e.g., holographic) display. As another example, display 1010 may include a digital or mechanical viewfinder, such as a viewfinder of the type found in compact digital cameras, reflex cameras, or any other suitable still or video camera.

In some embodiments, display 1010 may include display driver circuitry, circuitry for driving display drivers, or both. Display 1010 can be operative to present visual content provided by device 1000 (e.g., an avatar constructed from several assets). Display 1010 can be associated with any suitable characteristic geometry defining the size and shape of the display. For example, the display can be rectangular or have any other polygonal shape, or alternatively can be defined by a curved or other non-polygonal shape (e.g., a circular display).

It should be noted that one or more input components and one or more output components may sometimes be referred to collectively herein as an input/output ("I/O") interface (e.g., input component 1008 and display 1010 as I/O interface 1011). It should also be noted that input component 1008 and display 1010 may sometimes be a single I/O component, such as a touch screen that may receive input information through a user's touch of a display screen and that may also provide visual information to a user via that same display screen.

Electronic device 1000 may also be provided with an enclosure or housing 1001 that may at least partially enclose one or more of the components of device 1000 for protecting them from debris and other degrading forces external to device 1000. In some embodiments, one or more of the components may be provided within its own housing (e.g., input component 1008 may be an independent keyboard or mouse within its own housing that may wirelessly or through a wire communicate with processor 1002, which may be provided within its own housing).

Processor 1002 of device 1000 may include any processing or control circuitry operative to control the operations and performance of one or more components of electronic device 1000. For example, processor 1002 may be used to run operating system applications, firmware applications, media playback applications, media editing applications, or any other application. In some embodiments, processor 1002 may receive input signals from input component 1008 and/or drive output signals through display 1010.

Communications circuitry 1012 may be provided to allow device 1000 to communicate with one or more other electronic devices or servers using any suitable communications protocol. For example, communications circuitry 1012 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), file transfer protocol ("FTP"), real-time transport protocol ("RTP"), real-time streaming protocol ("RTSP"), secure shell protocol ("SSH"), any other communications protocol, or any combination thereof. Communications circuitry 1012 may also include circuitry that can enable device 1000 to be electrically coupled to another device (e.g., a computer or an accessory device) and communicate with that other device, either wirelessly or via a wired connection (e.g., via communications path 115 and/or 195 of FIG. 1).

Awareness component 1014 may be operative to detect awareness information of one or more particular types (e.g., movement or motion awareness information, location awareness information, audio awareness information, light awareness information, etc.). Awareness component 1014, which may be similar to awareness component 124 of FIG. 1, may be implemented in software, hardware, firmware of device 1000, or any combination of software, hardware, and firmware. For example, awareness component 1014 may include an application process, thread, or subroutine configured to compute the one or more various types of awareness information requested of device 1000.

In some embodiments, awareness component 1014 can be a motion awareness component that may include one or more three-axis acceleration motion-sensing components (e.g., an accelerometer) that may be operative to detect linear acceleration in three directions. As another example, such a motion awareness component can include one or more two-axis acceleration motion-sensing components that may be operative to detect linear acceleration along each of two axes. In some embodiments, awareness component 1014 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezoresistance type accelerometer, or any other suitable accelerometer.

In some embodiments, such a motion awareness component can indirectly detect rotation, rotational movement, angular displacement, tilt, position, orientation, motion along a non-linear (e.g., arcuate) path, or any other non-linear motions. For example, if awareness component 1014 is a linear motion awareness component, additional processing can be used to indirectly detect some or all of the non-linear motions. For example, by comparing the linear output of awareness component 1014 with a gravity vector (i.e., a static acceleration), awareness component 1014 may calculate the tilt of electronic device 1000 with respect to a particular axis (e.g., a y-axis). In some embodiments, awareness component 1014 may alternatively or additionally include one or more gyro-motion-sensing components or gyroscopes for directly detecting rotational movement. For example, awareness component 1014 can include a rotating or vibrating element. As another example, awareness component 1014 can include a magnetometer operative to detect the orientation of device 1000 relative a magnetic north pole. Electronic device 1000 may monitor changes in the output of the magnetometer to detect rotations of the device.

In some embodiments, awareness component 1014 can be a location awareness component. For example, awareness component 1014 may detect the location of electronic device 1000 using any suitable trilateration or triangulation technique, in which case awareness component 1014 may include a GPS receiver, RF triangulation detector or sensor, or any other location circuitry configured to determine the geographic or physical location of electronic device 1000. Awareness component 1014 may also communicate with (e.g., via communications module 1012) one or more remote servers or communications networks (e.g., third device 190 of FIG. 1) to determine the geographic or physical location of electronic device 1000. Awareness component 1014 may also include the associated applications to support such location circuitry.

In some embodiments, awareness component 1014 can be any other suitable type of environmental awareness component for detecting one or more particular environmental conditions. Therefore, awareness component 1014 may additionally or alternatively include one or more single-axis or multi-axis accelerometers, angular rate or inertial sensors (e.g., optical gyroscopes, vibrating gyroscopes, gas rate gyroscopes, or ring gyroscopes), magnetometers (e.g., scalar or vector magnetometers), light sensors, temperature sensors, pressure sensors, infrared ("IR") sensors, linear velocity sensors, thermal sensors, microphones, ambient light sensors ("ALS"), proximity sensors, capacitive proximity sensors, acoustic sensors, sonic or sonar sensors, radar sensors, image sensors, video sensors, GPS detectors, radio frequency ("RF") detectors, RF or acoustic doppler detectors, RF triangulation detectors, electrical charge sensors, peripheral device detectors, event counters, and/or combinations thereof. For example, processor 1002 may be configured to read data from one or more of the sensors or circuitries of awareness component 1014 to determine the orientation or velocity of electronic device 1000, and/or the amount or type of light, heat, or sound that device 100 is being exposed to, and the like.

Moreover, calendar-based awareness information may also be detected by awareness component 1014, which may additionally or alternatively include one or more temporal sensors, circuitries, and/or software applications for detecting calendar-based awareness information of electronic device 1000. For example, a temporal sensor may include, without limitation, a clock, differential clock, counter, differential counter, calendar, and combinations thereof. Awareness component 1014 may include or communicate with (e.g., via communications circuitry 1012) one or more calendars or clocking systems (e.g., iCal™ available by Apple Inc. of Cupertino, Calif. or MeetingMaker™ available by PeopleCube™ of Waltham, Mass.). Such calendars may include the ability to clock the time of day, day of the week, and place within one or more types of yearly calendar systems. Manufacturers, users, and/or third parties of device 1000 may each populate the calendar with specific occurrences that may be associated with one or more life events. For example, a user may enter a particular family member's birthday or meeting event into the calendar and define a calendar-based life event to be detected when that day occurs.

News-based awareness information may also be detected by awareness component 1014, which may additionally or alternatively include one or more sensors, circuitries, and/or software applications for detecting news-based awareness information of electronic device 100. For example, awareness component 1014 may include or communicate with (e.g., via communications module 1012) one or more news or information sources (e.g., via RSS or any other type of web feed format). Such news sources may include the ability to provide real-time or substantially real-time information regarding events occurring around the world.

It is to be understood that the steps shown in each one of processes 500-900 of FIGS. 5-9, respectively, are merely illustrative and that existing steps may be modified or omitted, additional steps may be added, and the order of certain steps may be altered.

Moreover, the processes described with respect to FIGS. 5-9, as well as any other aspects of the invention, may each be implemented in hardware or a combination of hardware and software. Embodiments of the invention can also be embodied as computer readable code on a computer readable medium. The computer readable medium may be any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code may be stored and executed in a distributed fashion.

Although many of the embodiments of the present invention are described herein with respect to personal computing devices, it should be understood that the present invention is not limited to personal computing applications, but is generally applicable to other applications.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for sharing environment information, the method comprising:
   receiving, at a first device, a request for environment information from a second device, wherein the first device comprises an environment sensor configured to detect a type of the requested environment information, wherein the second device is not configured to detect the type of the requested environment information, and wherein the requested environment information is indicative of one or more characteristics of:
   a surrounding environment of the first device; or
   a status of the first device within the surrounding environment;
   determining, by the first device, whether the second device was previously authorized to receive the type of the requested environment information from the first device; and
   when the second device was previously authorized:
   detecting, by the first device, the requested environment information using the environment sensor; and
   transmitting, by the first device, the requested environment information to the second device.

2. The method of claim 1, wherein the request for environment information specifies the type of the requested environment information.

3. The method of claim 1, wherein the previous authorization is determined based on the environment information having been previously provided to the second device.

4. The method of claim 1, wherein the second device was previously authorized by receiving, at the first device, a selection of one or more devices that are authorized for sending the requested environment information.

5. The method of claim 1, wherein the second device was previously authorized by the first device detecting a wired communications path with the second device.

6. The method of claim 1, wherein determining whether the second device was previously authorized is performed using a secret key in establishing a connection with the second device.

7. The method of claim 1, wherein the request for environment information is received as a broadcast from the second device.

8. The method of claim 1, wherein the requested environment information comprises at least one of: a position, an ambient light, a proximity, motion information, a temperature, a pressure, an image, audio information, magnetic information, and a humidity.

9. A first device comprising:
   an environment sensor;
   communications circuitry; and
   control circuitry coupled to the environment sensor and the communications circuitry, the control circuitry operative to:
      receive a request for environment information from a second device, the environment sensor configured to detect a type of the requested environment information, wherein the second device is not configured to detect the type of the requested environment information, and wherein the requested environment information is indicative of one or more characteristics of:
         a surrounding environment of the first device; or
         a status of the first device within the surrounding environment;
      determine whether the second device was previously authorized to receive the type of the requested environment information from the first device; and
      when the second device was previously authorized:
         detect the requested environment information using the environment sensor; and
         transmit the requested environment information to the second device.

10. The first device of claim 9, wherein the control circuitry is further operative to:
   perform a previous authorization by prompting a user of the first device to authorize providing the requested environment information.

11. The first device of claim 9, wherein the control circuitry is further operative to:
   perform a previous authorization by receiving, at the first device, a selection of one or more devices that are authorized for sending the requested environment information.

12. The first device of claim 9, wherein the control circuitry is further operative to:
   perform a previous authorization by detecting a wired communications path with the second device.

13. The first device of claim 9, wherein determining whether the second device was previously authorized is performed using a secret key in establishing a connection with the second device.

14. The first device of claim 9, wherein the request for environment information is received as a broadcast from the second device.

15. The first device of claim 9, wherein the environment sensor comprises at least one of: positioning circuitry, an ambient light sensor, a proximity sensor, a motion sensing component, a thermometer, a pressure sensor, a strain gauge, a microphone, a camera, an imaging sensor, a shock sensor, a magnetometer, a humidity sensor, RF sensing circuitry, and near field communications circuitry.

16. A non-transitory computer readable media storing computer readable code for controlling a first device to share environment information, the code comprising:
   receiving, at a first device, a request for environment information from a second device, wherein the first device comprises an environment sensor configured to detect a type of the requested environment information, wherein the second device is not configured to detect the type of the requested environment information, and wherein the requested environment information is indicative of one or more characteristics of:
      a surrounding environment of the first device; or
      a status of the first device within the surrounding environment;
   determining, by the first device, whether the second device was previously authorized to receive the type of the requested environment information from the first device; and
   when the second device was previously authorized:
      detecting, by the first device, the requested environment information using the environment sensor; and
      transmitting, by the first device, the requested environment information to the second device.

17. A method for sharing location information, the method comprising:
   receiving, at a first device, a request for location information from a second device, wherein the first device comprises a location sensor configured to detect a type of the requested location information, wherein the second device is not configured to detect the type of the requested location information;
   determining, by the first device, whether the second device was previously authorized to receive the type of the requested location information from the first device; and
   when the second device was previously authorized:
      detecting, by the first device, the requested location information using the location sensor; and
      transmitting, by the first device, the requested location information to the second device.

18. The method of claim 17, wherein the request for location information is received from the second device via a local connection between the first device and the second device.

19. The method of claim 17, wherein the previous authorization is determined based on the location information having been previously provided to the second device.

20. The method of claim 17, wherein the second device identifies the first device before sending the request for location information.

21. The method of claim 20, wherein the first device is identified by the second device from one or more trusted devices.

22. The method of claim 21, wherein the one or more trusted devices are defined by user input of selecting from a list, of entering identifying information of devices, or authorizing particular devices once communications paths with the devices are established.

23. The method of claim 17, wherein the second device does not know its location before sending the request for location information.

24. The method of claim 17, wherein the second device does not include a location sensor for determining a location of the second device.

25. The method of claim 17, wherein the second device was previously authorized by receiving, at the first device, a selection of one or more devices that are authorized for sending the requested location information.

26. The method of claim 17, wherein the second device was previously authorized by the first device detecting a wired communications path with the second device.

27. The method of claim 17, wherein determining whether the second device was previously authorized is performed using a secret key in establishing a connection with the second device.

* * * * *